(12) United States Patent
Jibiki

(10) Patent No.: US 7,612,958 B2
(45) Date of Patent: Nov. 3, 2009

(54) TELESCOPIC SIGHT

(75) Inventor: Ubao Jibiki, Tokyo (JP)

(73) Assignee: Yugen Kaisha Tokyosukopu, Tokyo (JP)

( * ) Notice: Subject to any disclaimer, the term of this patent is extended or adjusted under 35 U.S.C. 154(b) by 64 days.

(21) Appl. No.: 11/513,801

(22) Filed: Aug. 31, 2006

(65) Prior Publication Data

US 2008/0123186 A1 May 29, 2008

(51) Int. Cl.
*G02B 7/02* (2006.01)
(52) U.S. Cl. ................. 359/825; 359/819; 359/822; 359/823
(58) Field of Classification Search ......... 359/811–825, 359/399, 422, 826, 830; D16/132
See application file for complete search history.

(56) References Cited

U.S. PATENT DOCUMENTS

| | | | | |
|---|---|---|---|---|
| 4,789,231 A * | 12/1988 | Shimizu | ................. | 359/422 |
| 5,146,254 A * | 9/1992 | Tsurukawa et al. | .......... | 396/79 |
| 5,561,564 A * | 10/1996 | Nakamura et al. | .......... | 359/825 |
| 5,764,410 A * | 6/1998 | Jibiki | .................. | 359/422 |
| 6,598,332 B1 * | 7/2003 | Jibiki | .................. | 42/119 |
| 2001/0008579 A1 * | 7/2001 | Kudoh | .................. | 396/79 |
| 2005/0128603 A1 * | 6/2005 | Tsuji | .................. | 359/699 |
| 2006/0017836 A1 * | 1/2006 | Nuno et al. | .......... | 348/360 |
| 2006/0193625 A1 * | 8/2006 | Nomura | .............. | 396/349 |
| 2007/0003273 A1 * | 1/2007 | Yasuda | .............. | 396/349 |

FOREIGN PATENT DOCUMENTS

JP 7281101 10/1995

* cited by examiner

*Primary Examiner*—Jessica T Stultz
*Assistant Examiner*—Mahidere S Sahle
(74) *Attorney, Agent, or Firm*—Price, Heneveld, Cooper, DeWitt & Litton, LLP

(57) ABSTRACT

A telescopic sight includes a zoom mechanism with which an angle of adjustment of sighting can be enlarged, such that sighting precision of the telescopic sight can be stably maintained, and with which zooming can be performed with a light touch. The telescopic sight includes a zoom ring, an annular gear, a circumferential gear, an intermediate gear and a transmission mechanism. The zoom ring is turnably provided at an outer periphery of a lens barrel of a telescopic sight. The annular gear is provided at an inner periphery face of the zoom ring. The circumferential gear is rotatably provided, concentrically with the annular gear, at an inner periphery of the lens barrel. The intermediate gear is interposed between the annular gear and the circumferential gear and transmit rotation of the annular gear to the circumferential gear.

5 Claims, 6 Drawing Sheets

TELESCOPIC SIGHT

BACKGROUND OF THE INVENTION

1. Technical Field

The present invention relates to a telescopic sight which includes a zoom mechanism which stably maintains a sighting alignment of the telescopic sight and which implements zooming with a light touch.

2. Background Art

Heretofore, in a zoom mechanism of a telescopic sight, in order to transmit turning of a zoom ring disposed at the outside of a lens barrel to a cam tube disposed inside the lens barrel, a groove aperture with a circular arc form has been formed in the lens barrel. This groove aperture is opened in the circular arc form through a broad angle about an optical axis of the telescopic sight (for example, an angle of around 300°). Moreover, this groove aperture is disposed between a zoom lens and an eyepiece lens, and arranged in a direction intersecting the optical axis. Hence, there has been a problem in that the strength at locations of the groove aperture is low when external forces, such as impacts and the like, act on the lens barrel.

A telescopic sight for solving this previous problem is equipped with a zoom mechanism which does not require the broad-angle groove aperture. This sight has been proposed by the present inventor, as shown in FIGS. 6 and 7 (see Japanese Publication No. JP 7281101). In such a telescopic sight 51, a zoom ring 54 is mounted at a tubular body 53 which is joined to a lens barrel 52, and the zoom ring 54 is made rotatable with respect to the lens barrel 52. An annular gear 55 is provided at an inner periphery face of the zoom ring 54, and a circumferential gear 58 is provided at an outer periphery face of a cam tube 56, which is rotatably provided inside the lens barrel 52. Meanwhile, an intermediate gear 57 is rotatably provided in a small hole 59 in the tubular body 53. This intermediate gear 57 is interposed between the annular gear 55 and the circumferential gear 58. Thus, turning of the zoom ring 54 is transmitted via the intermediate gear 57 to the cam tube 56, so as to implement zooming of the telescopic sight 51.

SUMMARY OF THE INVENTION

Problem to be Solved by the Invention

The telescopic sight 51, also described in Japanese Publication No. JP 7281101, includes an alignment adjustment mechanism 60, which inclines the cam tube 56 to adjust alignment. Consequently, when the cam tube 56 is inclined at a time of alignment adjustment, meshing between the intermediate gear 57 and the circumferential gear 58 provided at the outer periphery face of the cam tube 56 is altered. Therefore, if an inclination angle of the cam tube 56 is set to be large, the meshing between the circumferential gear 58 and the intermediate gear 57 may become harsh or disengage, and it may not be possible to perform zooming with a light touch. Thus, there has been a problem in that making an alignment adjustment angle large is difficult.

Accordingly, the present invention provides a telescopic sight including a zoom mechanism which both enables a large alignment adjustment angle, such that alignment precision of the telescopic sight can be stably maintained, and implements zooming with a light touch.

Means for Solving the Problem

In order to solve the problem described above, the present invention provides a telescopic sight with a zoom mechanism including: a zoom ring which is rotatably disposed at an outer periphery of a lens barrel of the telescopic sight; an annular gear which is disposed at an inner periphery face of the zoom ring; a circumferential gear which is rotatably disposed, concentrically with the annular gear, at an inner periphery of the lens barrel; an intermediate gear which is interposed between the annular gear and the circumferential gear and provided so as to transmit rotation of the annular gear to the circumferential gear; and a transmission mechanism which transmits rotation of the circumferential gear to a cam tube which is rotatably disposed in the lens barrel.

The present invention further provides that the transmission mechanism includes a groove portion provided at the cam tube and a protrusion portion provided at the circumferential gear, and the protrusion portion and the groove portion are displaceably engaged. Further still, the telescopic sight of the present invention provides an alignment adjustment mechanism which inclines the cam tube at least one of vertically and horizontally for alignment. Further yet, the present invention further provides a telescopic sight, wherein the alignment adjustment mechanism includes: an inner tube which is disposed so as to rotatably support the cam tube; a curved ring which is disposed at an outer periphery of the inner tube; and a curved ring support member which is disposed so as to support the curved ring to be inclinable in vertical and horizontal directions.

According to a telescopic sight relating to the present invention, because the telescopic sight includes a zoom mechanism having a zoom ring which is rotatably disposed at an outer periphery of a lens barrel of the telescopic sight, an annular gear which is disposed at an inner periphery face of the zoom ring, a circumferential gear which is rotatably disposed, concentrically with the annular gear, at an inner periphery of the lens barrel, an intermediate gear which is interposed between the annular gear and the circumferential gear and provided so as to transmit rotation of the annular gear to the circumferential gear, and a transmission mechanism which transmits rotation of the circumferential gear to a cam tube which is rotatably disposed in the lens barrel, the annular gear and the circumferential gear are concentrically provided. As a result of this construction, the meshing between the annular gear and the intermediate gear and between the intermediate gear and the circumferential gear can be kept substantially constant. Thus, the zoom ring can be operated and the turning transmitted to the circumferential gear with a substantially constant torque. Furthermore, because turning of the circumferential gear is transmitted to the cam tube by the transmission mechanism, the cam tube can be consistently turned, and zooming can be implemented lightly and consistently.

Further, with the present invention, when the transmission mechanism includes a groove portion provided at the cam tube and a protrusion portion provided at the circumferential gear, and the protrusion portion and the groove portion are displaceably engaged, even if the cam tube is greatly inclined for alignment adjustment, the groove portion provided at the cam tube and the protrusion portion provided at the circumferential gear are movably engaged. With such construction, turning of the circumferential gear is consistently transmitted to the cam tube and zooming can be implemented.

Further, with the present invention, the alignment adjustment mechanism, which inclines the cam tube at least one of vertically and horizontally for adjusting alignment, provides alignment precision of the telescopic sight which is stably maintained.

Further, with the present invention, when the alignment adjustment mechanism includes an inner tube which is disposed so as to rotatably support the cam tube, a curved ring which is disposed at an outer periphery of the inner tube, and a curved ring support member which is disposed so as to support the curved ring to be inclinable in vertical and horizontal directions, the cam tube is supported by the curved ring and the curved ring support member. The cam tube can be greatly inclined, and it is possible to broaden an alignment adjustment range from close range to long range.

These and other features, objects and advantages of the present invention will become apparent upon reading the following description thereof together with reference to the accompanying drawings.

DETAILED DESCRIPTION OF THE PREFERRED EMBODIMENT

Figure 1:
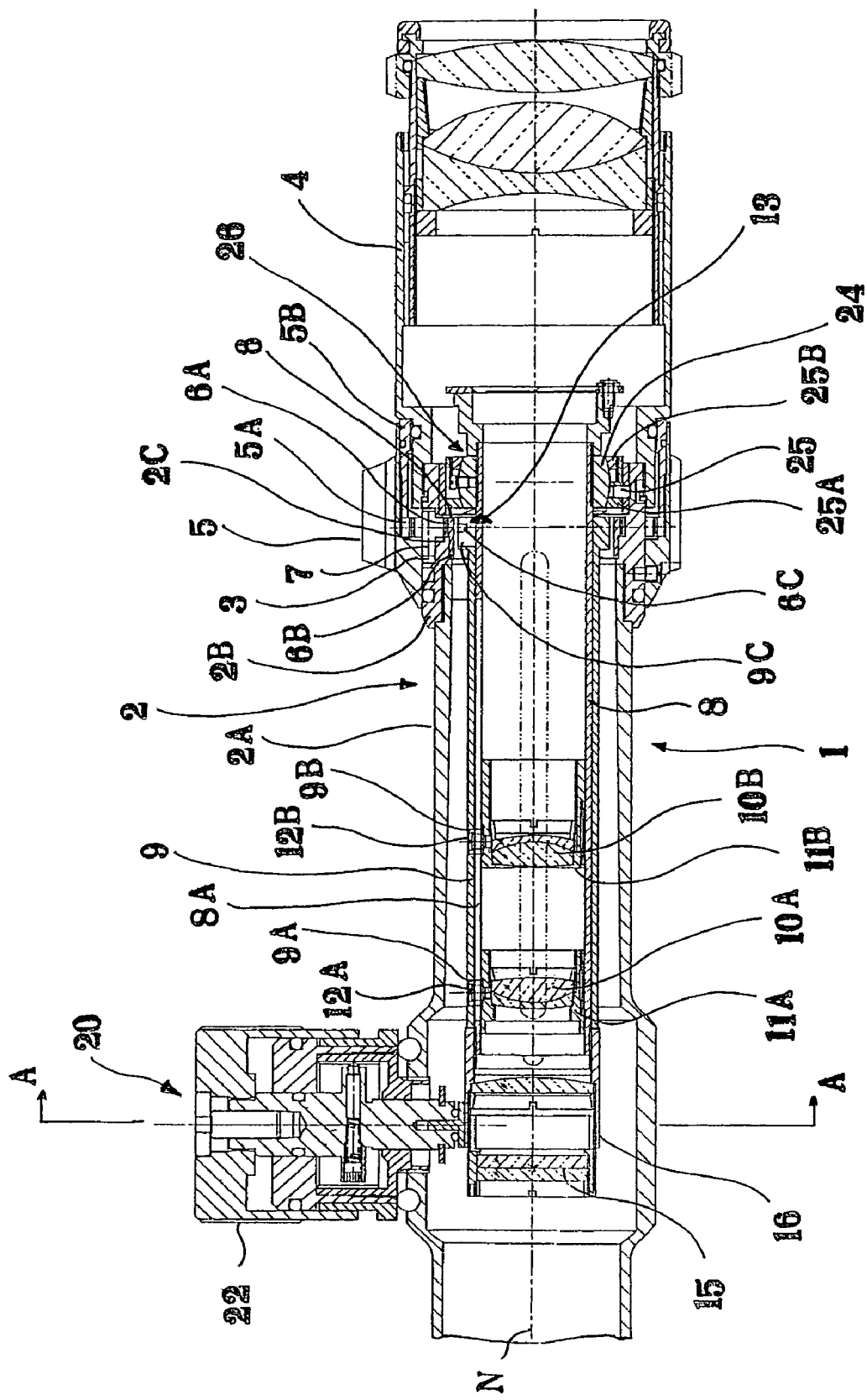
FIG. 1 is a partial vertical sectional side view showing the zoom mechanism of an embodiment of a telescopic sight of the present invention.

The present invention will be described with reference to the embodiment shown in FIGS. 1 to 5.

Reference numeral 1 in the drawings refers to a telescopic sight relating to the present invention. A zoom mechanism of the telescopic sight 1 is structured with a zoom ring 5, an annular gear 5A, a circumferential gear 6, an intermediate gear 7 and a transmission mechanism 13. The zoom ring 5 is rotatably provided at an outer periphery of a lens barrel 2. The annular gear 5A is provided at an inner periphery face of the zoom ring 5. The circumferential gear 6 is rotatably provided at an inner periphery of the lens barrel 2, concentrically with the annular gear 5A. The intermediate gear 7 is interposed between the annular gear 5A and the circumferential gear 6, and is provided so as to transmit turning of the annular gear 5A to the circumferential gear 6. The transmission mechanism 13 transmits rotation of the circumferential gear 6, which is rotatably provided inside the lens barrel 2, to a cam tube 9, which is rotatably provided inside the lens barrel 2.

Figure 2:
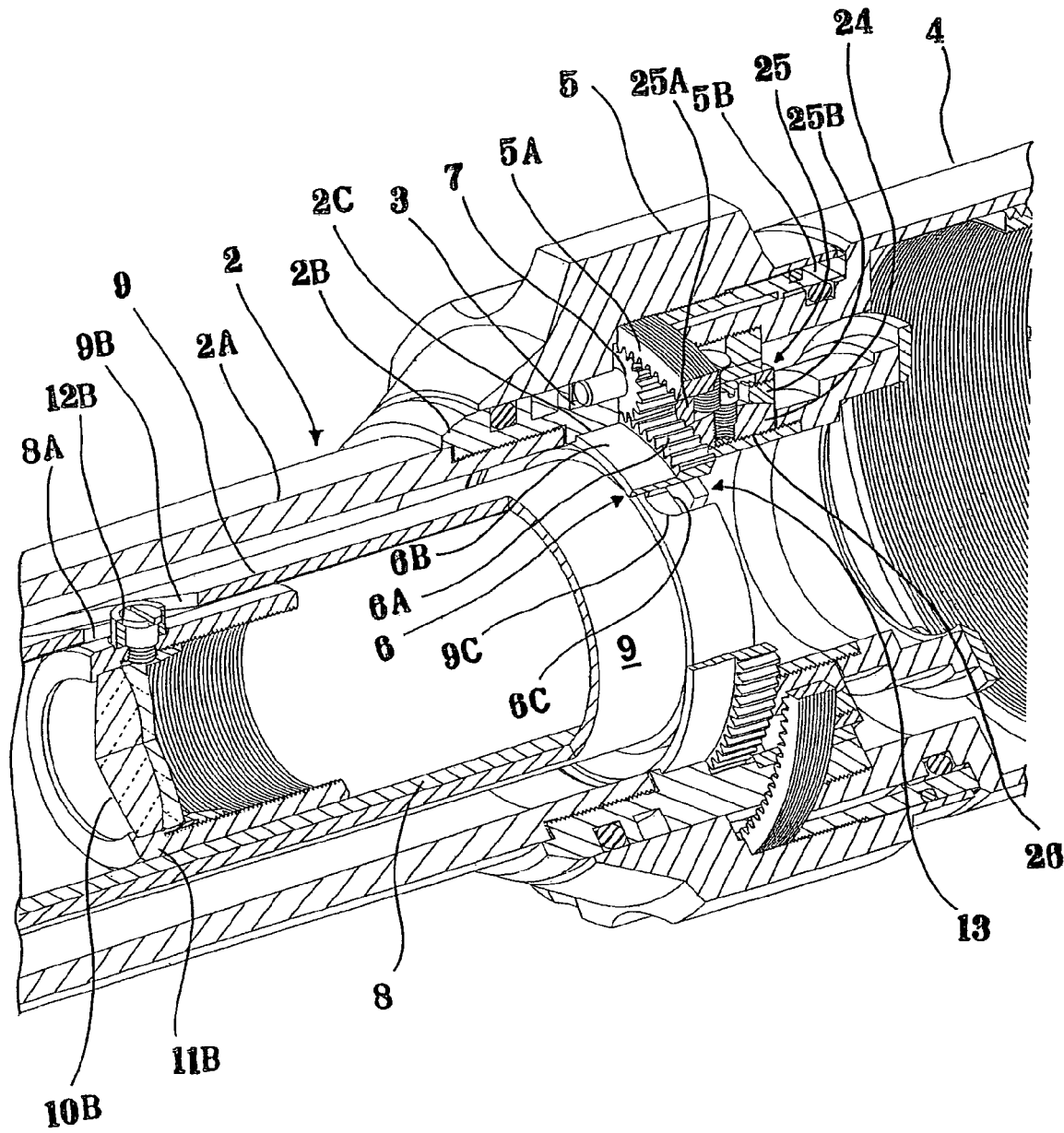
FIG. 2 is a partial cutaway perspective cross-sectional view showing the principal components of the embodiment of the present invention.

As shown in FIGS. 1 and 2, the lens barrel 2 is structured by a lens barrel main body 2A and a tube body 2B, which is joined to the lens barrel main body 2A. A substantially cruciform small hole 3 is formed in the tube body 2B. An axis of the intermediate gear 7 is set in parallel with an optical axis N of the telescopic sight 1, and the intermediate gear 7 is disposed transversely to the small hole 3, to be capable of rotating. Tooth portions of the intermediate gear 7 are structured such that portions thereof protrude slightly from the outer peripheral face and inner peripheral face of the tube body 2B.

In the embodiment of the drawings, the zoom ring 5 is rotatably provided at the outer periphery of the lens barrel 2. The annular gear 5A is provided to threadingly engage with a thread portion of the inner periphery of the zoom ring 5, and is fixed to the zoom ring 5 by a gear clasp 5B. The annular gear 5A meshes with the intermediate gear 7 disposed at the tube body 2B, and is structured such that the intermediate gear 7 rotates when the zoom ring 5 is operated to turn.

As shown in FIGS. 1 and 2, the circumferential gear 6 is structured by a gear portion 6A and a sliding surface 6B, which extends in the direction of optical axis N, and an inwardly extending protrusion portion 6C, which protrudes to an inner periphery side. The sliding surface 6B slides against a sliding surface 2C, which is provided concentrically with the annular gear 5A at the inner periphery of the tube body 2B. The circumferential gear 6 is provided to be concentric with the annular gear 5A and rotatable with respect to the tube body 2B. The circumferential gear 6 meshes with the intermediate gear 7 disposed at the tube body 2B, and is structured such that turning of the annular gear 5A is transmitted via the intermediate gear 7 to the circumferential gear 6. With this structure, the annular gear 5A and the circumferential gear 6 can be turned in a constantly concentric state, and meshing of the annular gear 5A with the intermediate gear 7 and of the intermediate gear 7 with the circumferential gear 6 can be kept substantially constant.

As shown in FIGS. 1 to 4 inside the lens barrel main body 2A, the cam tube 9 is rotatably provided to cover an inner tube 8, which is disposed inside the lens barrel main body 2A. A groove portion 9C is formed in the cam tube 9, and the protrusion portion 6C provided at the circumferential gear 6 displaceably engages with this groove portion 9C, structuring the transmission mechanism 13 which transmits turning of the circumferential gear 6 to the cam tube 9. With such a structure, even when the cam tube 9 is inclined for alignment adjustment, engagement of the protrusion portion 6C with the groove portion 9C is maintained, and turning of the circumferential gear 6 is transmitted to the cam tube 9.

Note that the transmission mechanism is not limited to the embodiment in the drawings. It is also possible to form a structure in which a protrusion portion is provided at the outer periphery of the cam tube 9, a groove portion is provided at an inner periphery of the circumferential gear 6, with the protrusion portion and groove portion displaceably engaged.

Figure 3:
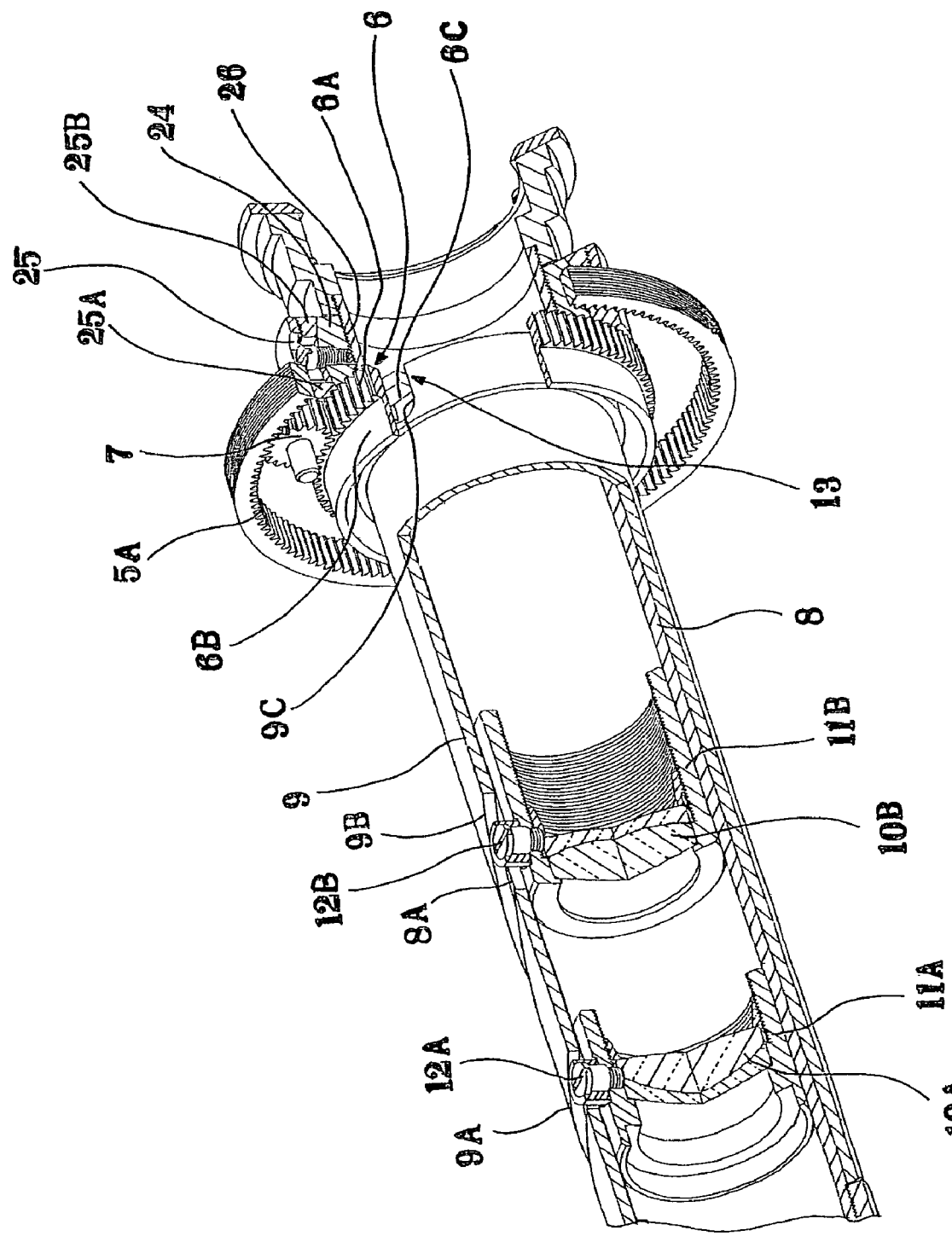
FIG. 3 is a partial cutaway perspective cross-sectional view showing details of the interior portions of the embodiment of the present invention.

As best seen in FIG. 3 in a circumferential face of the cam tube 9, two helical-form cam holes 9A and 9B are formed along angles which are quite sharply inclined with respect to the optical axis N. In the inner tube 8, a guide hole 8A is formed in parallel with the optical axis N and is provided to enable movement of zoom lenses 10A and 10B via support pieces 11A and 11B thereof. A screw 12A of the support piece 11A passes through a region at which the cam hole 9A and the guide hole 8A overlap, such that the zoom lens 10A moves in accordance with movement of the overlapping portion of the cam hole 9A and the guide hole 8A when the cam tube 9 is turned. Similarly, a screw 12B of the support piece 11B passes through a portion at which the cam hole 9B and the guide hole 8A overlap.

With the zoom mechanism of the structure described above, turning of the zoom ring 5 is transmitted to the circumferential gear 6 via the intermediate gear 7, and turning of the circumferential gear 6 is transmitted to the cam tube 9 via the transmission mechanism 13. Turning of the cam tube 9 is then converted, via the screws 12A and 12B and the support pieces 11A and 11B, to movement of the zoom lenses 10A and 10B in parallel with the optical axis N. Thus, zooming of the telescopic sight 1 is operated. In addition, because there is no limit on a turning angle of the zoom ring 5, it is possible to form the cam holes 9A and 9B in the cam tube 9 at the angles which are sharply inclined with respect to the optical axis N, and it is possible to lightly turn the zoom ring 5 with a small torque.

Figure 4:
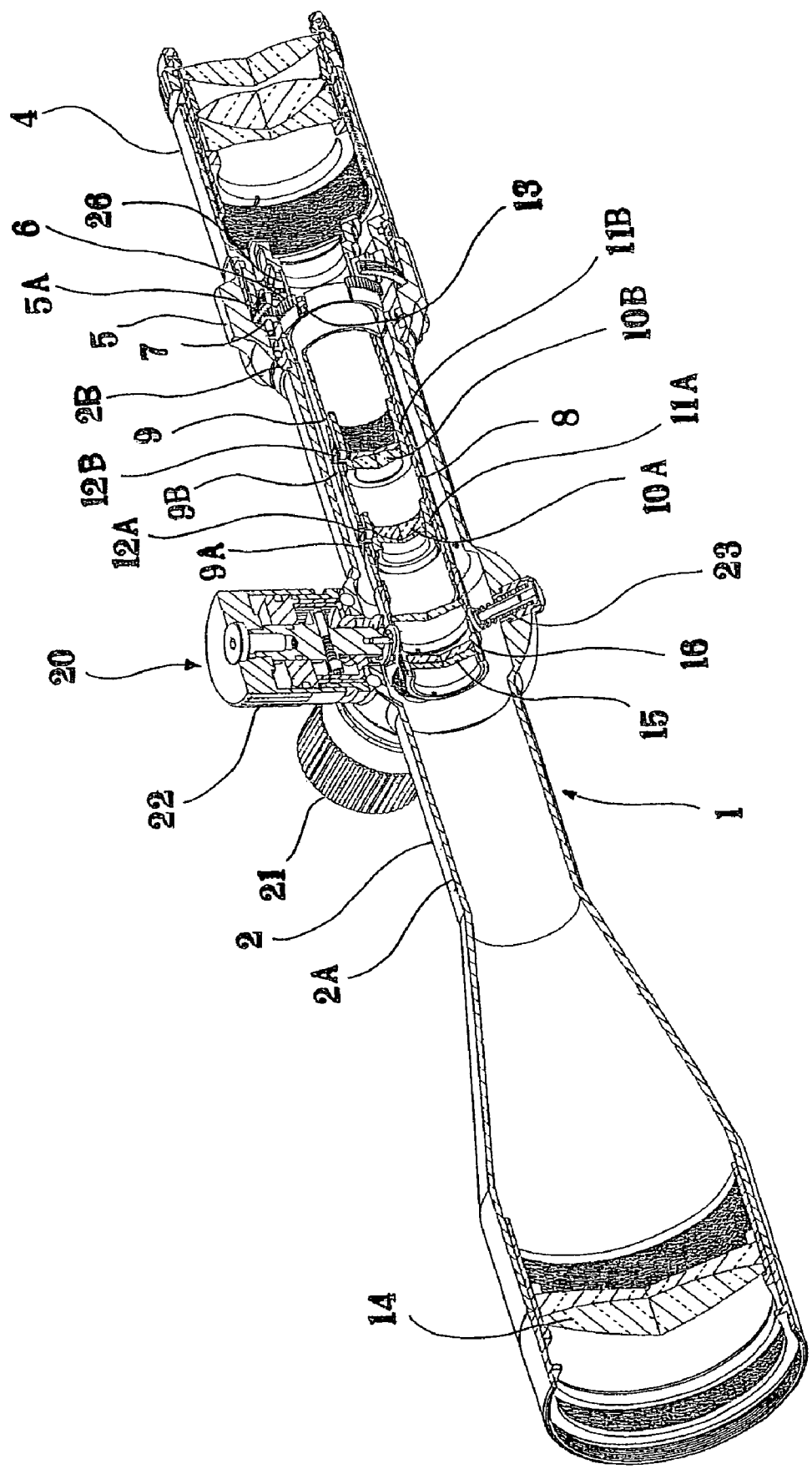
FIG. 4 is a partial cutaway cross-sectional perspective view showing the embodiment of the present invention.
Figure 5:
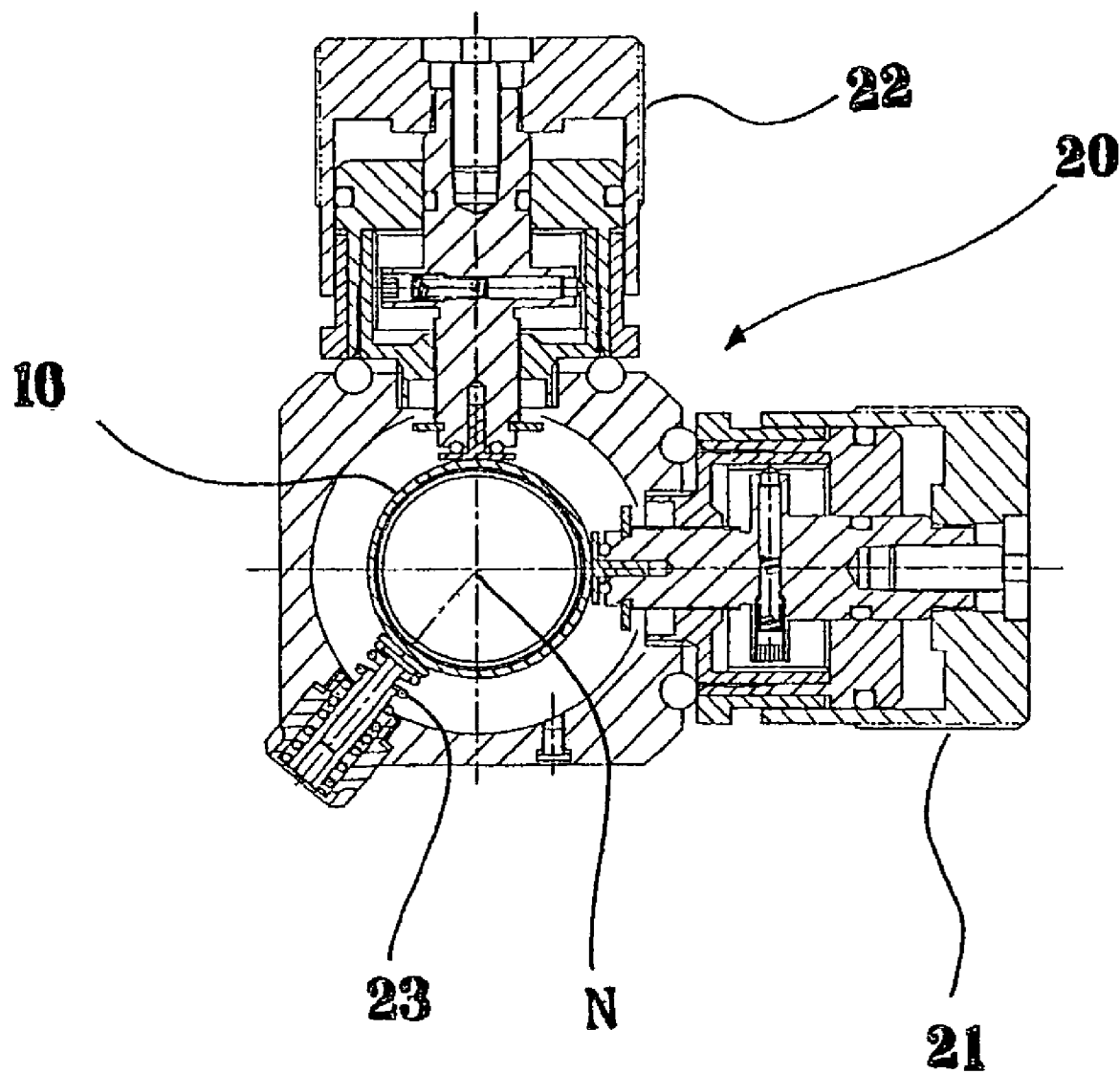
FIG. 5 is a cross-sectional view taken along line A-A of FIG. 1.
Figure 6:
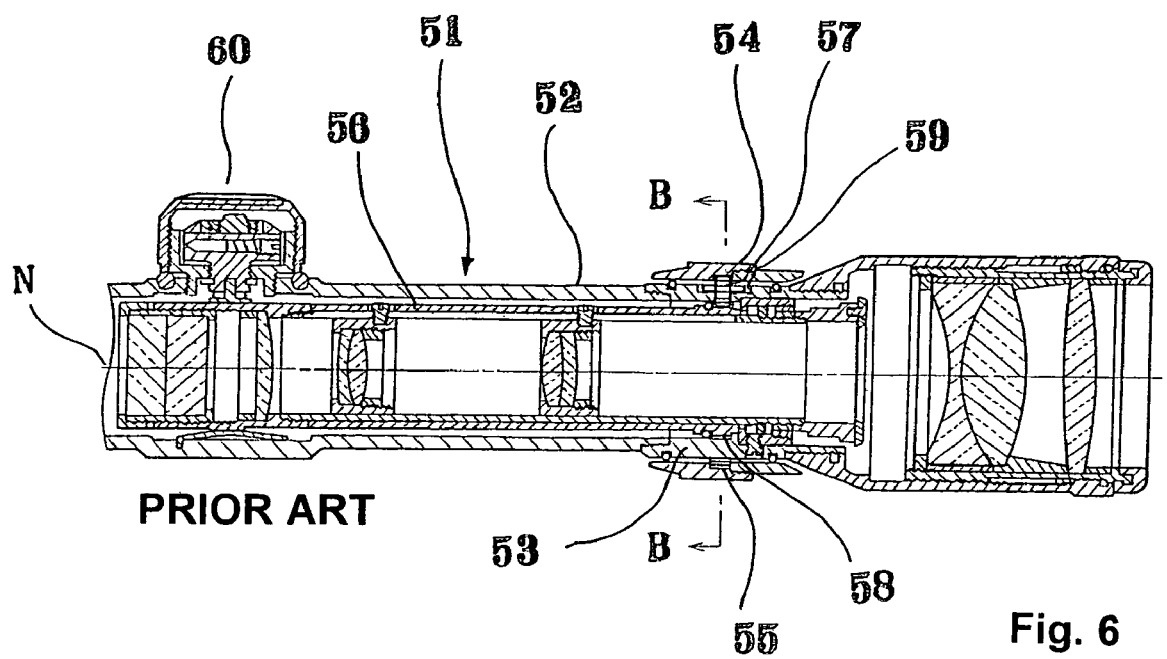
FIG. 6 is a partial vertical cross-sectional side view showing a zoom mechanism of an embodiment of a previous telescopic sight.
Figure 7:
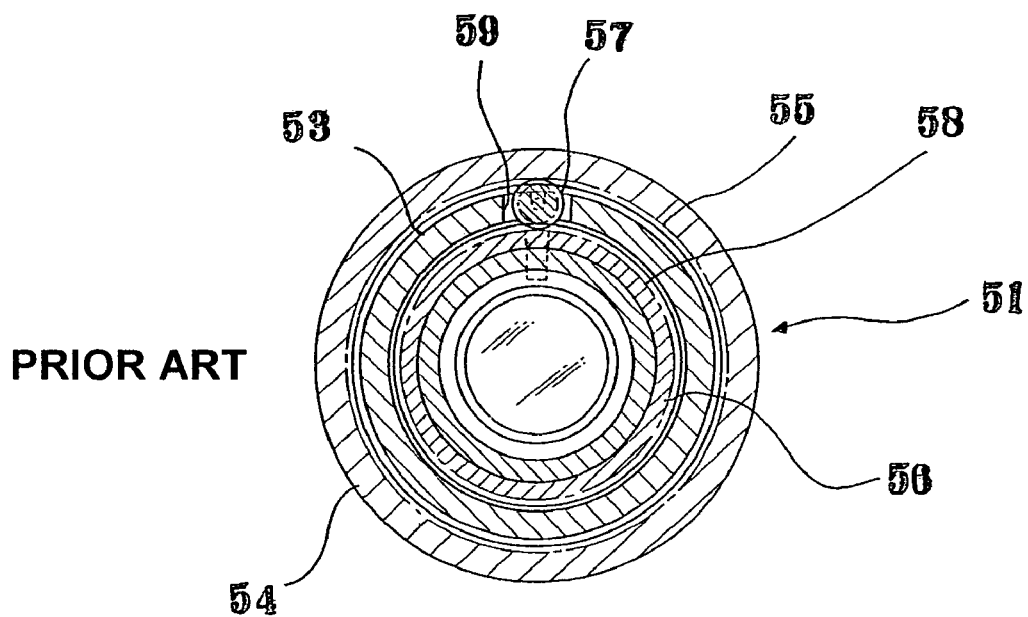
FIG. 7 is a cross-sectional view of the previous telescopic sight taken along line B-B of FIG. 6.

As shown in FIGS. 1, 4 and 5, an alignment adjustment mechanism 20 is provided substantially at the middle of the lens barrel main body 2A. The alignment adjustment mechanism 20 is for, when the telescopic sight 1 is mounted at a gun barrel, alignment adjustments between a direction of the gun barrel and the optical axis N of the telescopic sight 1 for actual shooting conditions.

In the embodiment of the drawings, the alignment adjustment mechanism 20 includes the inner tube 8 and an inner tube support mechanism 26. The inner tube 8 is provided so as to rotatably support the cam tube 9. The inner tube support mechanism 26 is structured by a curved ring 24, which is provided near the end of and at an outer periphery of the inner tube 8, and a curved ring support member 25, which is provided at the tube body 2B so as to support the curved ring 24 to be inclinable in up-down and left-right directions. The curved ring 24 is formed in the shape of a hollow sphere which has been truncated, with two parallel flat faces sandwiching the center of the sphere, and is provided at an end portion of the inner tube 8 at a side thereof at which an eyepiece section 4 is disposed. The curved ring support member 25 is structured by a partial ring 25A, which is fixed to the tube body 2B, and a holding portion 25B, which is provided to threadingly engage with an inner periphery of the partial ring 25A. Thus, the curved ring 24 is retained by the partial ring 25A and the holding portion 25B. The inner tube support mechanism 26 is preferably provided in a vicinity of the transmission mechanism 13, such that displacements of the inner tube 8 at the transmission mechanism 13 can be made small.

The alignment adjustment mechanism 20 is further structured by a horizontal alignment adjustment ring 21, which adjusts a declination angle, and a vertical alignment adjustment ring 22, which can adjust an elevation angle. A coil spring 23 is provided at a position opposing the horizontal alignment adjustment ring 21 and the vertical alignment adjustment ring 22 across the optical axis N. A support tube 16 with an intermediate lens 15 is joined to an end portion of the inner tube 8 at a side thereof at which an object lens 14 is disposed. The horizontal alignment adjustment ring 21 and the vertical alignment adjustment ring 22 can be rotated to push the support tube 16 for control, such that the inner tube 8 can be inclined to left or right (horizontally) and to up or down (vertically) about the inner tube support mechanism 26. By inclination of the inner tube 8, the zoom lenses 10A and 10B provided at the inner tube 8 and the cam tube 9 are inclined, and the alignment of the telescopic sight can be adjusted.

It will become apparent to those skilled in the art that various modifications to the preferred embodiment of the invention as described herein can be made without departing from the spirit or scope of the invention as defined by the appended claims.

The invention claimed is:

1. A telescopic sight including a zoom mechanism comprising:
    a lens barrel of the telescopic sight said lens barrel having an optical axis, said lens barrel including a zoom ring which is rotatably mounted at an outer periphery of said lens barrel;
    an annular gear which is mounted at an inner periphery face of the zoom ring for rotation with said ring, said annular gear having teeth projecting inwardly in a direction toward the optical axis of said lens barrel;
    a circumferential gear which is rotatably mounted at an inner periphery of the lens barrel said circumferential gear mounted concentrically with and axially aligned with the annular gear, said circumferential gear including teeth extending outwardly away from the axis of said lens barrel;
    an intermediate gear rotatably mounted to said zoom ring and interposed between said annular gear and said circumferential gear to transmit rotation of said zoom ring and annular gear to the circumferential gear;
    a cam tube which is rotatably mounted in the lens barrel for moveably supporting telescoping lenses; and
    a transmission mechanism extending between said cam tube and said circumferential gear which transmits rotation of the circumferential gear to said cam tube, wherein said transmission mechanism comprises a groove in one of said cam tube and circumferential gear and a protrusion on the other one of said cam tube and circumferential gear for engaging said circumferential gear with said cam tube.

2. The telescopic sight of claim 1 and further comprising an alignment adjustment mechanism which inclines the cam tube at least one of vertically and horizontally for adjusting alignment of said telescopic sight.

3. The telescopic sight of claim 2 wherein said alignment adjustment mechanism comprises:
    an inner tube which is positioned to rotatably support said cam tube;
    a curved ring which is mounted at an outer periphery of said inner tube; and
    a curved ring support member which is mounted to said lens barrel to support said curved ring to allow said inner tube and lenses coupled thereto to be inclinable in vertical and horizontal directions.

4. A telescopic sight including a zoom mechanism comprising:
    a lens barrel of the telescopic sight said lens barrel having an optical axis, said lens barrel including a zoom ring which is rotatably mounted at an outer periphery of said lens barrel;
    an annular gear which is mounted at an inner periphery face of the zoom ring for rotation with said ring, said annular gear having teeth projecting inwardly in a direction toward the optical axis of said lens barrel;
    a circumferential gear which is rotatably mounted at an inner periphery of the lens barrel said circumferential gear mounted concentrically with and axially aligned with the annular gear, said circumferential gear including teeth extending outwardly away from the axis of said lens barrel;
    an intermediate gear rotatably mounted to said zoom ring and interposed between said annular gear and said circumferential gear to transmit rotation of said zoom ring and annular gear to the circumferential gear;
    a cam tube which is rotatably mounted in the lens barrel for moveably supporting telescoping lenses;
    a transmission mechanism extending between said cam tube and said circumferential gear which transmits rotation of the circumferential gear to said cam tube, wherein said transmission mechanism comprises a groove in one of said cam tube and circumferential gear and a protrusion on the other one of said cam tube and circumferential gear for engaging said circumferential gear with said cam tube; and
    an alignment adjustment mechanism which inclines said cam tube at least one of vertically and horizontally for adjusting alignment of said telescopic sight.

5. A telescopic sight including a zoom mechanism comprising:
- a lens barrel of the telescopic sight said lens barrel having an optical axis, said lens barrel including a zoom ring which is rotatably mounted at an outer periphery of said lens barrel;
- an annular gear which is mounted at an inner periphery face of the zoom ring for rotation with said ring, said annular gear having teeth projecting inwardly in a direction toward the optical axis of said lens barrel;
- a circumferential gear which is rotatably mounted at an inner periphery of the lens barrel said circumferential gear mounted concentrically with and axially aligned with the annular gear, said circumferential gear including teeth extending outwardly away from the axis of said lens barrel;
- an intermediate gear rotatably mounted to said zoom ring and interposed between said annular gear and said circumferential gear to transmit rotation of said zoom ring and annular gear to the circumferential gear;
- a cam tube which is rotatably mounted in the lens barrel for moveably supporting telescoping lenses;
- a transmission mechanism extending between said cam tube and said circumferential gear which transmits rotation of the circumferential gear to said cam tube, wherein said transmission mechanism comprises a groove in one of said cam tube and circumferential gear and a protrusion on the other one of said cam tube and circumferential gear for engaging said circumferential gear with said cam tube; and
- an alignment adjustment mechanism which inclines said cam tube at least one of vertically and horizontally for adjusting alignment of said telescopic sight, said alignment adjustment mechanism comprising:
  - an inner tube which is positioned to rotatably support said cam tube;
  - a curved ring which is mounted at an outer periphery of said inner tube; and
  - a curved ring support member which is mounted to said lens barrel to support said curved ring to allow said inner tube and lenses coupled thereto to be inclinable in vertical and horizontal directions.

* * * * *

UNITED STATES PATENT AND TRADEMARK OFFICE
CERTIFICATE OF CORRECTION

| | | |
|---|---|---|
| PATENT NO. | : 7,612,958 B2 | Page 1 of 1 |
| APPLICATION NO. | : 11/513801 | |
| DATED | : November 3, 2009 | |
| INVENTOR(S) | : Ubao Jibiki | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 78 days.

Signed and Sealed this

Nineteenth Day of October, 2010

David J. Kappos
*Director of the United States Patent and Trademark Office*